Figure 1:
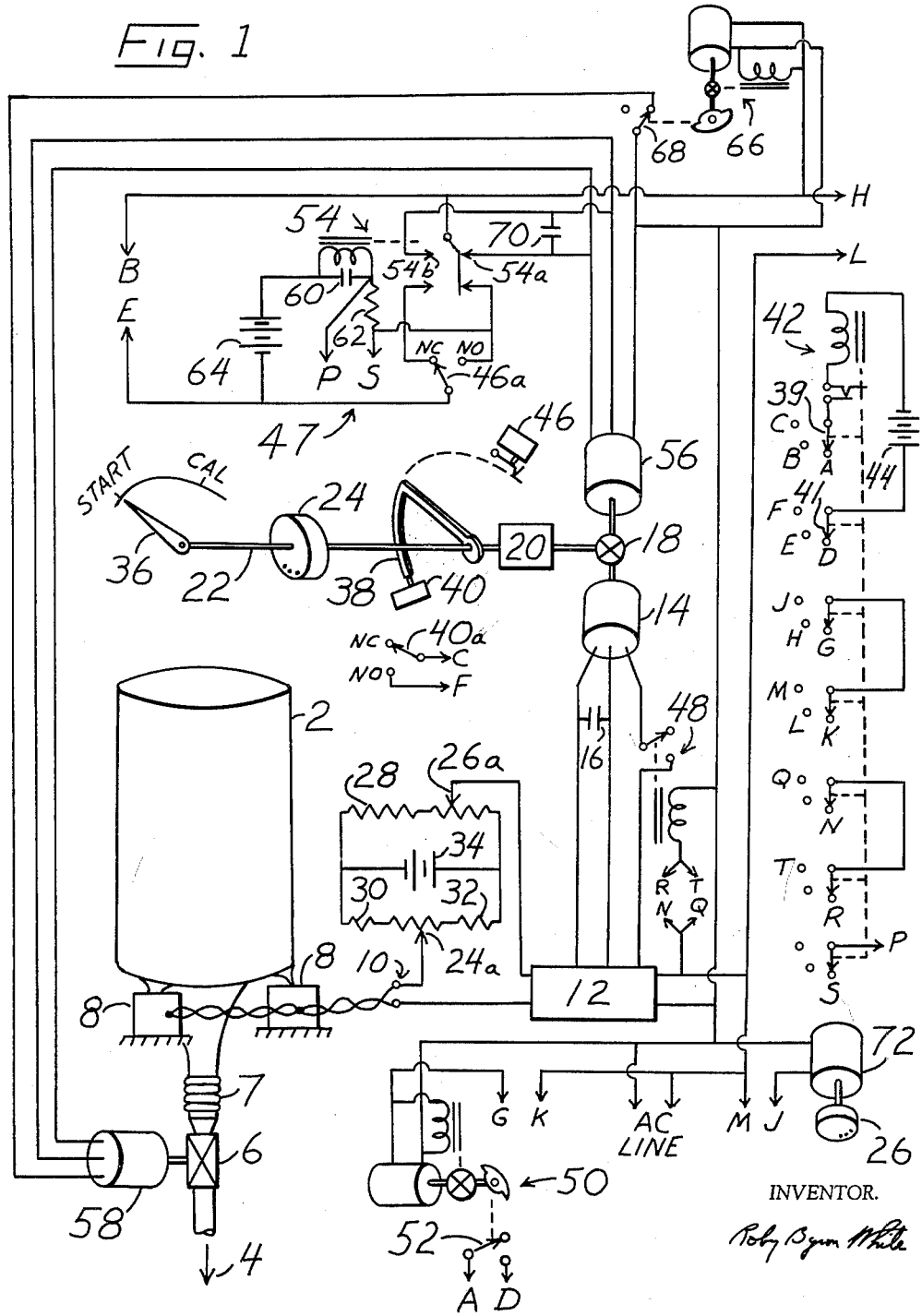

May 16, 1961  R. B. WHITE  2,984,386
INTERMITTENT TIME-RATE CONTROLLER
Filed Sept. 10, 1957  2 Sheets-Sheet 1

INVENTOR.
Roby Byron White

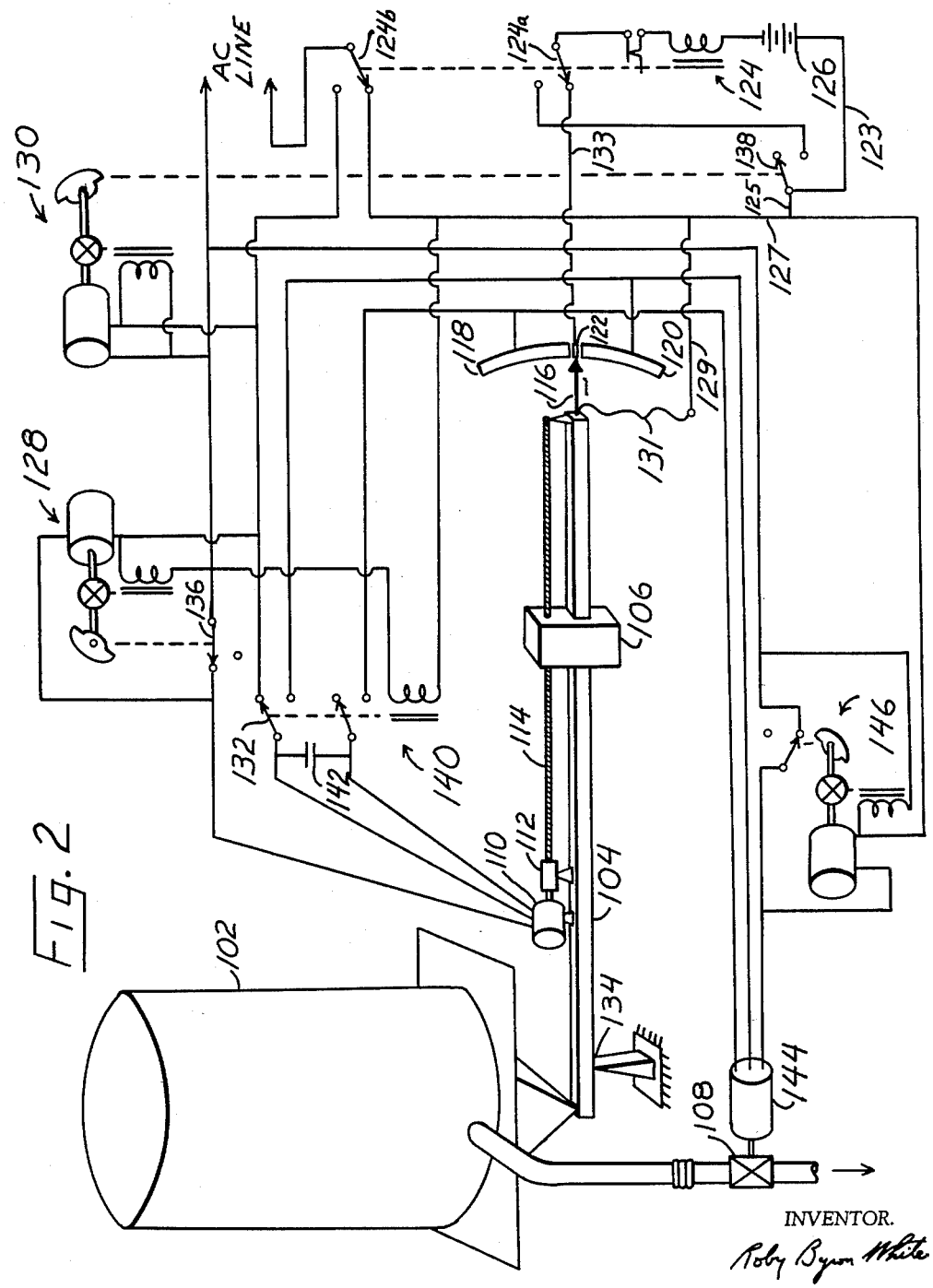

2,984,386
Patented May 16, 1961

2,984,386

INTERMITTENT TIME-RATE CONTROLLER

Roby Byron White, 381 N. Main St., Sharon, Mass.

Filed Sept. 10, 1957, Ser. No. 683,161

6 Claims. (Cl. 222—58)

The present invention relates to controllers and control methods and in particular to controllers capable of maintaining a constant rate of change and a variable rate of change of a controlled variable with respect to time.

An object of this invention is to provide a controller capable of maintaining variations of a parameter in a system or process at a constant known rate with respect to time. Dimensions of control might be inches per second, pounds per minute, etc.

Another object of this invention is to provide a generalized method of controlling a process by virtue of being able to control, for example, the rate of material addition as a function of time.

Further objects and advantages of this invention as well as its arrangement, construction and operation will be apparent from the following description and claims in connection with the accompanying drawings in which:

Figure 1 shows the electro-mechanical circuit of this invention controlling the liquid discharge from a tank at constant pounds-per-minute, the sensing being done with electrical weigh-cells; and Figure 2 shows a similar electro-mechanical circuit but arranged for operation with a beam balance.

In the drawings, the legends NO and NC designate the normally open or normally closed contacts of the switch or relay in question.

Essentially, this invention involves the measurement of the value of a variable which is to be controlled at a known time rate-of-change, predicting what the new value of the variable will be after a known time, comparing the predicted with the actual value of the variable at the end of the known time, and using the difference and direction between the just compared values as an indication of how much and in what direction to change the controlling factor on the rate-of-change of the variable.

Thus in Fig. 1, a tank 2 is filled with a liquid which is to be discharged as indicated at 4 at a specified number of pounds per minute; the rate of flow of the liquid is controlled by valve 6. The successive steps in the controller cycle to maintain the specified pounds per minute are as follows:

(1) Measure the weight of the tank and liquid contained at time "$t$" as a reference starting point.

(2) Knowing the desired rate of weight loss as "$m$" pounds per second, calculate that over "$a$" seconds there will be a net weight loss of "$am$" pounds and that the total weight of the tank and liquid after "$a$" seconds should be pounds after = pounds before $- am$ (3) After "$a$" seconds, compare the actual weight with the predicted "pounds after" weight and if they are not alike, make a change in the valve setting in such a direction that an equivalent comparison in the next cycle will be more nearly alike than the one in the current cycle.

(4) Return to step 1 and repeat the above three steps over and over.

In Fig. 1, the weighing of the tank 2 is done by the electrical weigh cells 8. Although only two are shown, any number may be used and should be arranged with their output voltages adding so that an electrical signal analog of the tank weight is presented to the terminals 10. A flexible connector 7 interconnects the discharge pipe which contains the valve 6 and the tank 2. This connector allows rigidity in the pipe without disturbing the weight measurement. In the foregoing description, the weigh cells 8 may typically be of the strain gauge type described in the book "Electric Resistance Strain Guages" by Dobie and Isaac, page 97. The voltage at terminals 10 is summed with the voltage across opposite points of a Wheatstone bridge whose characteristics will be described below and the sum fed to amplifier 12 which in turn drives servo motor 14 with phase shifting capacitor 16. The servo amplifier 20 and associated motor 22 may be any of a large number of types commercially available, many of which are described in the book "Theory of Servomechanisms" by James, Nichols, and Phillips. This is a null balance system; the motor drives through a differential 18 and a gear train 20 to a shaft 22 which turns a potentiometer 24. Potentiometer 24 is electrically represented at 24a. Thus the amplifier and motor turn shaft 22 until there is zero input at amplifier 12. The shaft rotation is then an analog of the weight sensed by the cells 8. By electrically expanding the scale, ninety degrees of rotation of shaft 22 may be made equal to one-onehundredth (0.01) of the original weight of the tank including contents; the electrical suppression and expansion is provided by the combination of resistors 26a, 28, 30 and 32 and battery 34 which are especially selected to provide the proper scale for the problem at hand. Potentiometer 26a is adjustable over one-hundred times the range of potentiometer 24a and thus can bring the servo to balance within the ninety degree working range no matter how much liquid is in the tank. Thus the first step listed above is met by manually adjusting potentiometer 26a until the pointer 36 is at "start." For future reference, at this same rotation of shaft 22, a cam 38 carried by the shaft 22 will have just actuated a snap switch 40.

Rotary stepping switch 42 controls the sequencing of the steps in this controller. This switch is self actuated to the next step when the appropriate contacts of the first two banks 39 and 41 are shorted out which causes excitation of the coil of the switch 42 by a battery 44. Thus if any one of the points of contact AD, BE, or CF is shorted, the switch 42 will step to the following position. The various contacts on this switch have been lettered and these letters connect to like letters in the circuit. Assume that switch 42 is on the first position shorting out G–K, N–R, and S–P. Polarities are such that as the weight of tank 2 decreases, the cam 38 approaches the actuator of a switch 46. The angular travel of the shaft 22 from the point where the end of cam 38 just actuates switch 40 to the point where cam 38 just actuates switch 46 is preadjusted to a known weight differential by the ratios of resistors 30, 24a and 32. During this time a relay 48 is actuated by the R–N short of the switch 42; at the same time, a motor driven timer 50 with a quick acting differential reset is actuated by the G–K short of switch 42. Timers of the type shown schematically at 50 start timing when voltage is applied and a coil and magnetic arm blocks a differential in series with the cam; at the end of the time interval, a single pole double throw switch is thrown; when power is removed the differential is freed and the cam resets to start a new timing cycle. It will be noted that the shorting of contacts R–N introduces the coil of relay 48 across lines 45 and 47 which in turn are directly connected to the A.C. line; likewise shorting contacts G–K introduces the line power to the motor driven timer 50. At the end of a predetermined time, motor driven timer 50 actuates its switch 52 and shorts A–D, causing switch 42 to step to its middle position. At the middle position, relay 48 drops out stopping motor 14 because contacts 2–N are now open. Thus a precise time interval is allowed for the cam 38 to travel from switch 40 to switch 46. The number of pounds represented by the desired cam travel, divided by the time allowed is the required pounds-per-second. The actual weight dispensed during the timed interval is represented by the actual position of cam 38. Thus the position of cam 38 with respect to switch 46 forms the comparison required by step (2) above.

At this point either of two conditions can exist; cam 38 has or has not actuated switch 46. Assume first that it has not actuated the switch 46; this means that the actual liquid weight flow is too low and valve 6 should be opened slightly. The circuit 47 accomplishes this. Switch 46a is the electrical circuit of switch 46. Since switch 46 has not been actuated, switch 46a is in its normally closed position. At the middle position of switch 42, H—L is shorted and line power is applied to the swinging contact of relay 54; this relay may be of any relatively high impedance coil type in which the contacts can be wired to give the characteristic shown, for example, a double-pole-double-throw relay with the swinging arms tied together. The contacts 54a and 54b of relay 54 excite a motor 56 which also drives the shaft 22 and in a manner such that cam 38 approaches and actuates switch 46. Simultaneously a motor 58 controlling the discharge control actuates that valve in a direction to increase the flow from the tank. At the moment switch 46 is actuated by cam 38 a circuit is completed through relay 54 to short out B—E and switch 42 steps to its third position. The shorting contacts of B—E is accomplished by switch 46a closing its normally open contact and the relay 54 being in the position shown. A capacitor 60 and a resistor 62 have a sufficient time constant to keep the battery 64 from actuating the coil of relay 54 before switch 42 can step to the next position.

Thus the motor 58 has changed the position of the valve 6 to increase the flow and the amount of change was proportional to the difference between the actual and expected weights of tank 2. For stability of control it is desirable to limit to some maximum value the incremental changes in position of the valve 6; this is accomplished by a motor driven timer 66 which actuates a switch 68 in series with the A.C. power to motor 58. A capacitor 70 acts as phase-shifting direction control for motors 56 and 58.

For the case where cam 38 has actuated switch 46 i.e., the actual liquid weight flow is too large, switch 46a is on the normally open side at the time P—S is shorted, and relay 54 is instantly energized. Thus when switch 42 is in the middle position, the relay 54 will cause motor 56 to drive in such a direction as to release the switch 46 and the motor 58 will reduce the opening of the valve 6 up to the predetermined maximum limit as set at the timer 66. At the moment switch 46 is released the capacitor 60 will hold relay 54 energized and B—E will be shorted to step switch 42. As a result, the position of valve 6 will be properly changed to correct either a too great or too small rate of flow. When the rate of liquid flow is very nearly at the desired point valve 6 will be changed very little because the correction drive of motor 56 will take such a short time. This completes the requirements of steps (2) and (3) above.

It now remains to reset the electrical suppression to give a new base point for operation of the next cycle. This is done by switch 42 shorting J—M and Q—T on the third position. Motor 72 drives potentiometer 26 in such a direction as to cause the servo amplifier 12 now activated by relay 48 to return cam 38 to actuate switch 40. At the moment of actuation, switch 40a shorts C—F and returns switch 42 to its first position and the cycle begins again. This sequence of events repeats over and over thus obtaining and maintaining constant pounds-per-second flow of liquid from the tank independent of density, temperature, pressure, or fluid head. The circuits necessary for resetting the suppression potentiometer 26 when the tank 2 is refilled are not shown as these can be easily added by any technician skilled in the art.

Fig. 2 shows a primarily mechanical device for accomplishing the same result. The weight of liquid and tank 102 is balanced against the weight 106 by a beam balance 104. The discharge of the liquid within the tank is controlled by a valve 108. The position of the weight 106 is controlled by a motor 110 driving through a gear train 112 and a lead screw 114. Balance of the beam 104 is indicated by a feeler 116 which makes contact with either of two partial slip rings 118 and 120 or with a balance point indicator 122.

A two step procedure is employed as indicated by the position of a latching relay 124 shown in the lower position. With the beam 104 at balance a circuit will be complete so that a battery 126 will actuate relay 124. This circuit may be traced from the relay 124 and the battery 126 through the leads 123, 125, 127, 129, 131, the feeler 116 and the indicator 122, and through the lead 133 and the switch 124a back to the relay 124. Relay 124 may be of the Type OCS relay made by Automatic Electric Company of Chicago, Illinois. After actuation, relay 124 will be in the upper position on the diagram. This will cause a pair of motor driven timers 128 and 130 to be placed across the A.C. line by the switch 124b and will start their timing function. Motor 110 is also placed across the line through contact 132 and the contact 124b. The motor 110 will cause weight 106 to move down the bar toward the fulcrum 134 which supports the beam 104. After a given time interval the timer 128 will actuate its switch 136 stopping the motor 110; thus the time multiplied by the gear train ratio, the lead screw ratio, the beam balance ratio and the motor speed provide the desired weight reduction. The timer 130 actuates switch 138 after a known time interval and this weight reduction and time provide the desired pounds-per-second flow of liquid. When switch 138 is actuated, relay 124 latches to the lower position.

With the relay 124 in the lower position, a relay 140 is actuated by contact 124b which causes the motor 110 to be driven by the feeler 116 on one of the two slip rings 118 or 120. A capacitor 142 connected across the motor 110 determines the motor direction according to whether the beam is high or low and this in turn causes the weight 106 to be moved in such a direction to bring the beam to its balanced position. Simultaneously a motor 144, driven in parallel with motor 110, corrects the setting of the flow control valve 108 so that on the next cycle the beam will be more nearly in balance after the time interval of timer 130. Just as in the prior embodiments the maximum change in valve position is limited by the action of a timer 146.

The foregoing description was limited to the situation wherein the beam 104 was not in balance at the required time. When the beam 104 does come to balance, or if it was already in balance the feeler 116 engages the balance indicator 122 and relay 124 is actuated causing the cycle to repeat. Thus this mechanization has the same proportional and limited action on the discharge control valve as does the embodiment of Fig. 1.

Although the illustrations show the application to a liquid mass flow problem it is apparent that the speed of turning of a screw conveyer could be controlled for handling dry bulk materials as could the speed of a conveyer belt for the same purpose. As a time rate controller, the steam flow to a cooking kettle could be controlled to give a uniform degrees-per-minute rise in the cooking temperature.

A controller of this nature is capable of automatically maintaining a constant rate-of-change of a variable in a system by adjusting a control factor of the system which in turn affects the rate-of-change of the variable being controlled. Thus in Fig. 1, the system is the tank of liquid, the weighing method, the valve, the discharge, and perhaps whatever the discharge is used for; the variable is the mass of the liquid in the tank, and the rate-of-change of the variable is the mass flow from the tank; the "control factor" is the valve itself which in turn affects the rate-of-change of the mass in the tank with respect to time. It is possible to change the set point of the controller with respect to time, and in this case the total control of the system of Fig. 1 is rate-of-change of mass flow with respect to time, thus the second derivative with respect to time.

In the claims the generic term system is used to describe any system or process, electrical, mechanical or chemical in nature, to which the techniques herein described may find application. Although the controller was described as applied to a specific application it is not intended that the invention be limited to this application and those skilled in the art could readily apply the principles herein described for rate-of-change and rate-of-rate-of-change control to diverse problems in many fields.

Having thus described the invention, listed its advantages and illustrated a few of its applications,

I claim:

1. Apparatus for maintaining a predetermined constant rate of change of a variable with respect to time wherein a control device is provided to vary the rate of change of the variable and a measuring device is provided to render a continuous representation of the actual value of the variable; comprising a timer for indicating a selected time interval, predicting means operatively connected to the timer for representing the amount of expected change in the variable during said interval, means operatively connected to the measuring device and the predicting means for comparing the represented actual and expected values of the variable at the end of the time interval, reset means operatively connected to the predicting means for resetting the measuring device to conform the represented actual value of the variable with its represented expected value, and actuating means operatively connected to the reset means for changing the position of the control device a discrete amount as a function of the difference between the represented actual and expected values of the variable.

2. Apparatus as defined in claim 1 further characterized by means forming part of the actuating means for making the discrete changes in the control device proportional in magnitude to the difference between the represented actual and expected values.

3. Apparatus as defined in claim 1 further characterized by means forming part of the actuating means for limiting the magnitude of the discrete changes in the control device to a predetermined maximum amount regardless of the difference between the represented actual and expected values.

4. Apparatus as defined in claim 2 further characterized by means forming part of the actuating means for limiting the discrete changes in the control device to a predetermined maximum amount regardless of the difference between the represented actual and expected values.

5. Apparatus as defined in claim 1 further characterized by means operatively connected to the predicting means, comparing means, reset means, and actuating means causing them to recycle continuously.

6. Apparatus for maintaining a preselected time rate of change in the weight of a tank of fluid wherein an adjustable valve is provided for varying the flow of fluid to or from the tank and a weighing device is provided for representing continuously the actual weight of the tank of fluid; comprising predicting means including a timer for representing the expected weight of the tank after a selected time interval, comparing means operatively connected to the weighing device and the predicting means for comparing the represented expected and actual weights of the tank at the end of the interval, means controlled by the comparing means and connected to the valve for conforming the represented actual and expected weights of the tank and adjusting the valve a discrete amount which is a function of the difference between the compared represented weights, and means operatively connected to the predicting means, comparing means, and actuating means causing the apparatus to recycle automatically.

References Cited in the file of this patent

UNITED STATES PATENTS

| | | |
|---|---|---|
| 1,993,527 | Mears | Mar. 5, 1935 |
| 2,544,155 | Harkenrider | Mar. 6, 1951 |
| 2,636,642 | Gorin | Apr. 28, 1953 |
| 2,662,665 | Harper | Dec. 15, 1953 |
| 2,712,414 | Ziebolz et al. | July 5, 1955 |
| 2,718,982 | Long | Sept. 27, 1955 |
| 2,763,399 | Heacock | Sept. 18, 1956 |
| 2,796,197 | Griddle | June 8, 1957 |
| 2,842,311 | Petrie | July 8, 1958 |

OTHER REFERENCES

Control Engineering, February 1956, pages 21, 22.